United States Patent
Ogle, II

(10) Patent No.: US 9,108,807 B1
(45) Date of Patent: Aug. 18, 2015

(54) LINEAR INDUCTION MOTOR-DRIVEN DIVERT MECHANISMS

(71) Applicant: Amazon Technologies, Inc., Reno, NV (US)

(72) Inventor: David Arthur Ogle, II, Bridgeport, TX (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 14/108,870

(22) Filed: Dec. 17, 2013

(51) Int. Cl.
| | |
|---|---|
| *B65G 47/10* | (2006.01) |
| *B65G 47/53* | (2006.01) |
| *B65G 13/04* | (2006.01) |

(52) U.S. Cl.
CPC .............. *B65G 47/53* (2013.01); *B65G 13/04* (2013.01)

(58) Field of Classification Search
USPC ............... 198/370.01, 370.03, 370.13, 371.2, 198/371.3, 690.1; 193/35 MD
See application file for complete search history.

(56) References Cited

U.S. PATENT DOCUMENTS

| | | | | |
|---|---|---|---|---|
| 2008/0271972 | A1* | 11/2008 | Szarkowski et al. .... | 193/35 MD |
| 2010/0089274 | A1* | 4/2010 | Austin ..................... | 198/370.06 |
| 2010/0207488 | A1* | 8/2010 | Ting et al. ............... | 310/323.06 |
| 2011/0273052 | A1* | 11/2011 | Long et al. .............. | 310/208 |
| 2012/0273328 | A1* | 11/2012 | Sejourne ................. | 198/788 |
| 2013/0113307 | A1* | 5/2013 | Kim et al. ............... | 310/40.5 |
| 2013/0127285 | A1* | 5/2013 | Yano ...................... | 310/156.43 |
| 2013/0256098 | A1* | 10/2013 | Petack, Burkhard ..... | 198/835 |

* cited by examiner

*Primary Examiner* — James R Bidwell
(74) *Attorney, Agent, or Firm* — Athorus, PLLC

(57) ABSTRACT

Linear induction motor-driven divert mechanisms may be installed or associated with conveying systems and may cause a change in velocity of one or more objects (i.e., a change in direction and/or a change in speed) to passing through the conveying systems. The divert mechanisms may include one or more spherical rotors including magnetizable slugs, and the spherical rotors may be rotatably positioned above positioned above one or more stator plates. Energizing one or more of the stator plates causes the corresponding spherical rotors to rotate in a given direction. Therefore, the divert mechanism may be used to transport or direct objects within conveying systems by controlling the rotation and angular velocity of one or more of the spherical rotors, which may impart motion to the objects.

18 Claims, 14 Drawing Sheets

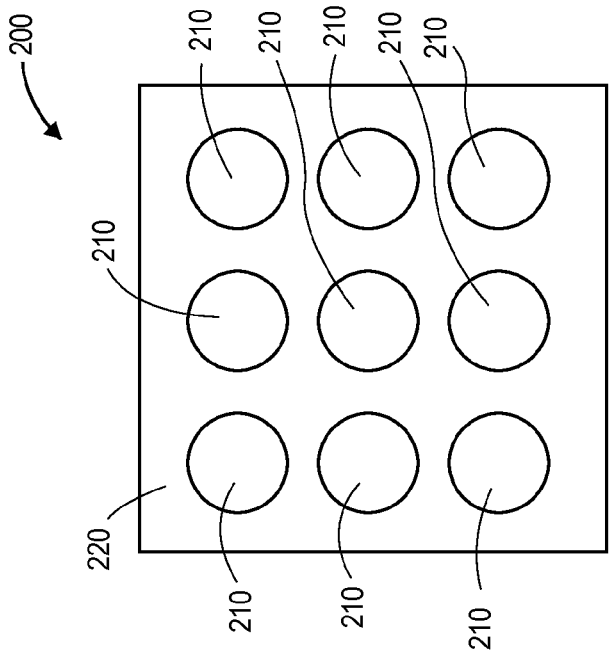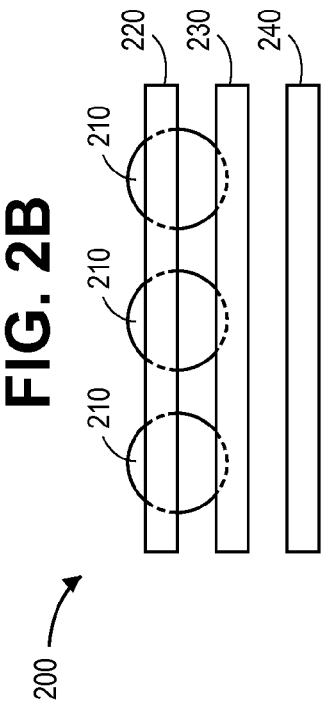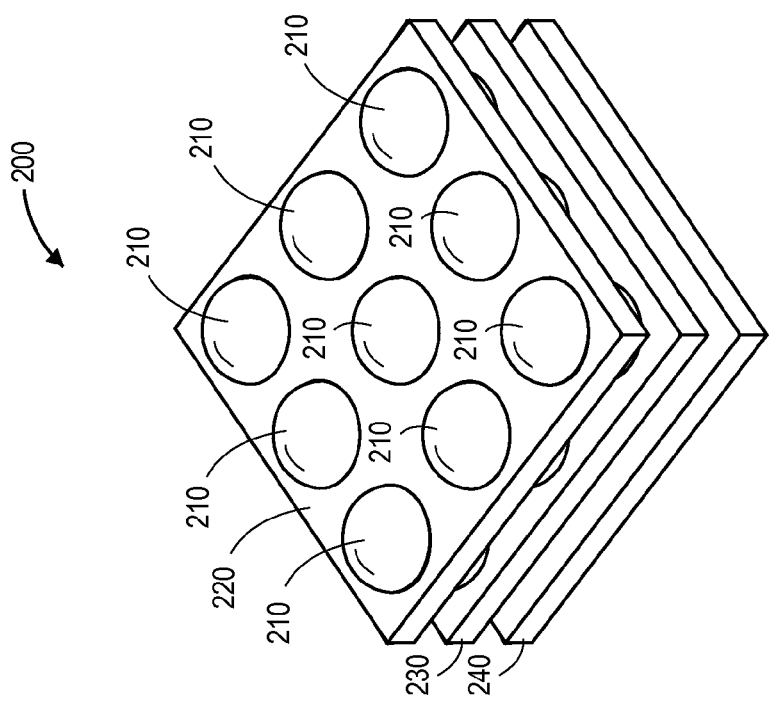

LINEAR INDUCTION MOTOR-DRIVEN DIVERT MECHANISMS

BACKGROUND

Conveyor systems are mechanical systems for transporting large objects or materials from one location to another. Such systems may be employed in a variety of throughput applications. For example, conveyor belts are regularly used for translating suitcases, bags or other luggage through airports, for moving parts or components along an assembly line, or for transferring items or packages through a shipping facility. Typically, a conveyor system includes one or more movers for conveying objects in a single dimension or direction, such as a conveyor belt, e.g., a system of two or more pulleys or pulley-like wheels causing motion of a continuous loop band, as well as one or more machines or features for changing a direction of travel of objects being conveyed, as well as for moving objects from one conveyor to another, or for transferring objects into a bin, chute or other like apparatus. Such machines or features are sometimes called "diverters," "divert mechanisms," or, simply, "diverts."

Various types of diverts are used to modify the directions of travel of conveyed objects. For example, a "pop-up" divert installed within a conveying system, e.g., between two conveyor belts, may mechanically or pneumatically rise from beneath an object being conveyed on the belts, lift the object out of a predefined path of the conveying system, and move the object in another direction, such as onto another conveyor or into another apparatus. A pusher divert may include a mechanized extendable implement installed alongside, above or around a moving element of a conveying system, such as a conveyor belt. Upon initiation, a pusher may push an object off of the moving element and into a bin or other container for further processing or removal. A steerable wheel divert may also be installed within a conveyor system and may include one or more wheels that may be mechanically oriented to rotate about a desired axis, which may cause the rotation of the wheels to deviate from an axis of orientation of the conveyor system. When a change in a direction in which objects are being conveyed is desired, the steerable wheel divert may be steered to orient the wheels in a direction that deviates from the axis of orientation by a desired angle, and diverts the objects in the direction defined by the rotation of the wheels.

The use of diverts of the prior art in conveying systems includes a number of inherent limitations, however. First, diverts are static machines or devices which typically feature a single level of functionality. For example, a pusher divert may merely push objects being conveyed in a single direction. As a result, an entire conveying system must usually be taken offline in order to add a divert to, or to remove a divert from, the conveying system for the purpose of moving objects in a desired direction, as conveying systems which include diverts are not easily changed or adapted for different purposes. Second, and perhaps more significantly, each divert requires the use of intrinsic, dedicated hardware usually featuring large and typically heavy motorized components which provide mechanical prime movers in one or more defined direction. For this reason, diverts usually require the most extensive and frequent maintenance of any element of a conveying system.

BRIEF DESCRIPTION OF THE DRAWINGS

FIGS. 2A, 2B and 2C show components of one embodiment of a linear induction motor-driven divert mechanism, in accordance with embodiments of the present disclosure.

DETAILED DESCRIPTION

Figure 1B:
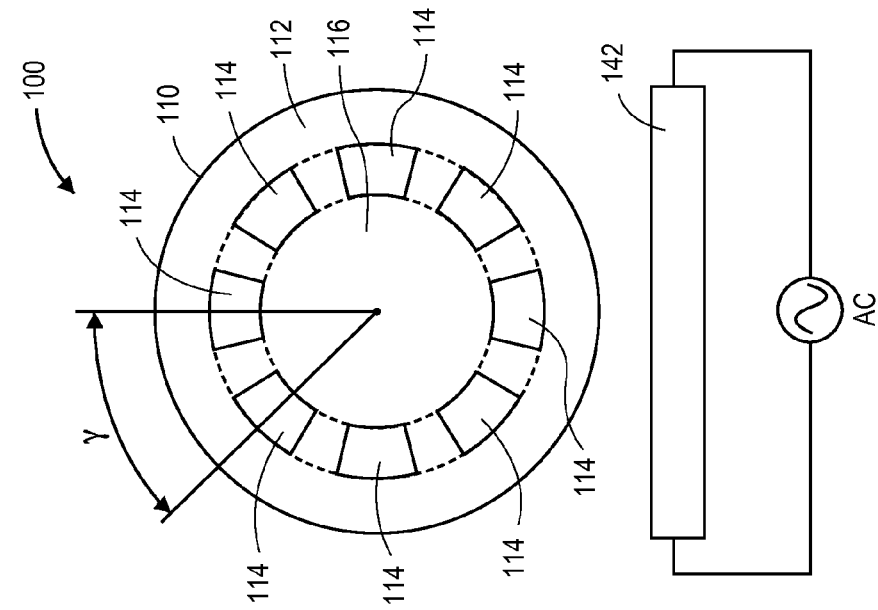
FIGS. 1A, 1B, 1C and 1D show components of one embodiment of a linear induction motor-driven divert mechanism, in accordance with embodiments of the present disclosure.

As is set forth in greater detail below, the present disclosure is directed to conveying systems having divert mechanisms that are driven by one or more linear induction motors. Specifically, the systems and methods disclosed herein include linear induction motor-driven divert mechanisms featuring one or more spherical rotors and one or more plate-like stators that may be installed in series with other components of a conveyor system, such as a conveyor belt or other apparatus, and configured to enable one or more objects to pass over the rotors. By applying current to a stator in a defined polarization or direction and/or at a particular frequency, the spherical rotors may rotate about a specific axis and at a particular angular velocity, thereby causing any objects passing over the rotors to move in a direction consistent with the rotation and angular velocity of the rotors.

According to the present disclosure, a conveying system may include a linear induction motor-driven divert having a single spherical rotor controlled by the application of current to a single rotor plate at one or more levels or frequencies, or one or more spherical rotors arranged in a multi-dimensional array, where each of the spherical rotors may be manipulated by the application of current to corresponding rotors at one or more levels or frequencies. When linear induction motor-driven divert mechanisms of the present disclosure are applied within a conveying system, such that objects are arrive thereon from an ingress apparatus, such as an ingress conveyor belt, the direction and rate of motion of the objects may be controlled by individually manipulating the current and frequency applied to each of the stators, which causes a rotation of each of their corresponding rotors. The net effect of the rotations of each of the rotors on passing objects may be summed into a vector representative of a change in velocity imputed to such passing objects in terms of a direction and a speed. Accordingly, the linear induction motor-driven diverts of the present disclosure may be used to initiate or secure the translation of objects within a conveyor system, or to change the direction or rate of translation of the items within the conveyor system, and the linear induction motor-driven diverts may provide improved versatility of conveying systems, allowing greater precision and control over the conveyance of items therethrough.

Conveyor systems may be used to transport objects, items or materials of varying sizes and shapes, and typically include any number of machines or elements for causing the motion or translation of such objects, items or materials from one location to another. The machines or elements that cause or enable such motion or translation may be driven by any form of mover, including belts, chains, screws, tracks or rollers, and the objects, items or materials may be transported in a container or carrier, or on or within the mover itself. A conveyor system may further include one or more pulleys, shafts, hubs, bushings, sprockets, bearings and other elements for causing a movement of the conveyor. Further, a conveyor system may convey objects, items or materials into one or more static or dynamic apparatuses, such as a bin, a chute, a cart, a truck or another like machine.

One component commonly found in conveyor systems is a conveyor belt, which may include a banded continuous-loop belt (e.g., rubber or fabric) that is placed into motion by a series of two or more pulleys, at least one of which is driven by a motor. Objects, items or materials may be placed directly onto the belt, or into one or more bins or like containers that may be placed on the belt. Similarly, a chain conveyor may carry one or more pendants, which may be used to pull unit loads on pallets or in other large-scale containers. Conveyor systems may also include a gravity conveyor, which may consist of a series of rollers that may be used to move objects based on a difference in height, and a resulting difference in gravitational potential energy, without the use of a motor.

While conveyor systems may effectively move large and heavy objects over short or long distances, such systems may require frequent maintenance in order to maximize their levels of performance. For example, a conveyor belt may require periodic repairs or replacements of damaged belts, and alterations to one or more pulleys, or the motors for driving such pulleys. Additionally, the pulleys and motors of a conveyor belt may require regular lubrication in order to minimize the impact of friction on their operation. Furthermore, chains or belts in a conveyor system require take-up adjustments, as well as the removal of any dirt, fouling or other contamination that may impede their effectiveness.

Divert mechanisms are frequently used to change a direction of travel of one or more objects within a conveyor system, or to cause such objects to travel in an intended direction toward a desired destination. A divert mechanism may be used to direct an object from one conveyor apparatus (e.g., an ingress conveyor belt) to another (e.g., an egress conveyor belt, or another egress apparatus such as a bin, a chute, a cart or a truck), or to remove or otherwise extricate an object from a conveyor system entirely. Some common divert mechanisms include a pusher divert, which may physically move one or more objects traveling on a conveyor into an adjacent apparatus or container, or onto another conveyor, as well as a steered wheel divert, which may be installed in series with a conveyor, and may include one or more wheels to permit items to roll or pass thereon. The wheels of a steered wheel divert may be pivoted to any orientation with respect to an axis or direction of travel of the conveyor, thereby causing objects traveling on the conveyor to move in a different direction upon striking the wheels of the steered wheel divert.

Many other divert mechanisms may be used to change the directions or orientations of objects traveling on a conveyor, or to otherwise reorient, reposition or sort such objects. Like other components of a conveyor system, however, divert mechanisms also frequently require maintenance and adjustment in order to ensure that such mechanisms are operating as intended. Moreover, divert mechanisms are usually limited to a single purpose or function: for example, a pusher divert is typically adapted to push or otherwise move objects that are being conveyed by a conveyor system in a single direction. In order to move conveyed objects in a different direction, the conveyor system must be taken off-line such that the pusher divert may be reconfigured within the conveyor system, or replaced with another divert mechanism of the same type, or of another type.

Those of ordinary skill in the pertinent art will recognize that induction motors typically include two discrete parts, a rotor and a stator, wherein the rotor is usually placed within the stator such that the rotor and the stator are separated from one another by an air gap that permits the rotor to rotate freely within the stator. The rotor and the stator may each be formed of yokes having windings embedded or lodged within predefined slots therein, which are referred to as poles. An application of an alternating current (or "AC") to the stator windings creates a rotating magnetic flux in the stator, i.e., a stator flux. Despite the lack of contact between the stator and the rotor, the stator flux thereby generates a voltage potential in each of the rotor windings according to Faraday's Law. Because the rotor windings are in the presence of the magnetic field generated by the stator flux, the rotor windings are subjected to a mechanical force, which is sometimes called a Lorentz Force, that causes the rotor to rotate along with the rotating magnetic stator flux.

In a three-phase AC motor, stator windings are usually circumferentially separated by 120 degrees(120°), or $2\pi/3$ radians, about the stator. The application of three-phase AC to the stator windings will thus generate three separate fluxes that combine to create a magnetic field that rotates at the same frequency as the AC applied to the stator windings. A synchronous speed of an induction motor is therefore defined by the equation:

$$N_s = 120 \cdot f/P$$

where $N_s$ is the synchronous speed of the motor, f is the frequency of the AC applied to stator, and P is the number of stator poles. The operating speed of an induction motor usually never reaches the synchronous speed, and instead differs from the synchronous speed by a phenomenon known as slip. Thus, an operational speed of a rotor in an induction motor is typically a function of frequency of current applied to a stator. Moreover, induction motors are easy to operate and control, at least because they are subjected to reduced wear-and-tear based on the non-contacting nature of the stator and the rotor.

A linear induction motor, which may sometimes be called a "linear motor," is an induction motor that is used to cause motion in a straight line, as opposed to rotation, i.e., torque. Linear induction motors operate under the same principles as induction motors in general, except that whereas an induction motor features a coiled, rounded stator, the stator of a linear induction motor is typically unrolled into a flat plate. Thus, linear induction motors typically feature stator windings, viz., primary windings, of a finite length, rather than a continuous loop. When the stator windings are energized in a vicinity of rotor windings, viz., secondary windings, a magnetic force is applied to the rotor windings, thereby causing the rotor to rotate.

The systems and methods of the present disclosure are directed to the use of linear induction motor-driven diverts in conveying systems. Specifically, the systems and methods disclosed herein employ divert mechanisms which feature one or more spherical rotors or rotor balls having a plurality of magnetized or magnetizable rotor slugs which may be uniformly embedded therein, in close proximity to an external surface of the spherical rotors. The divert mechanisms may be installed in association (e.g., in series or in parallel) with one or more other standard components of a conveyor system, such as a conveyor belt, and aligned to permit one or more objects (e.g., items, materials, parcels or other things) arriving from an ingress apparatus to pass across a surface of one or more of the spherical rotors and onto or into an egress apparatus. When one or more stator elements is energized within a vicinity of the rotor slugs, the spherical rotors or rotor balls may be caused to rotate about at least one axis in conjunction with the one or more magnetic fields that are created upon the energization of the stator elements. Thus, when a linear induction motor-driven divert of the present disclosure is aligned within a conveyor system, the linear induction motor-driven divert may cause the velocity (i.e., the direction and/or speed) of an object passing over the one or more spherical rotors or rotor balls to change, or to remain constant, in a manner consistent with the rotation of the spherical rotors or rotor balls that was initiated by the energization of the stator elements. In this regard, the linear induction motor-driven divert may be adapted to transfer the objects to one or more egress apparatuses, or to remove the objects from the conveying system.

The linear induction motor-driven diverts of the present disclosure may therefore be utilized in any environment in which the transfer or removal of objects from a conveyor system is desired, and may replace any number of existing divert mechanisms for sorting products along a surface. Alternatively, one or more of the linear induction motor-driven diverts of the present disclosure may be utilized for the purpose of conveying objects, i.e., as a primary element of a conveyor system, if the one or more spherical rotors or rotor balls are caused to rotate in a common direction, i.e., about one or more parallel or collinear axes.

Figure 1A:
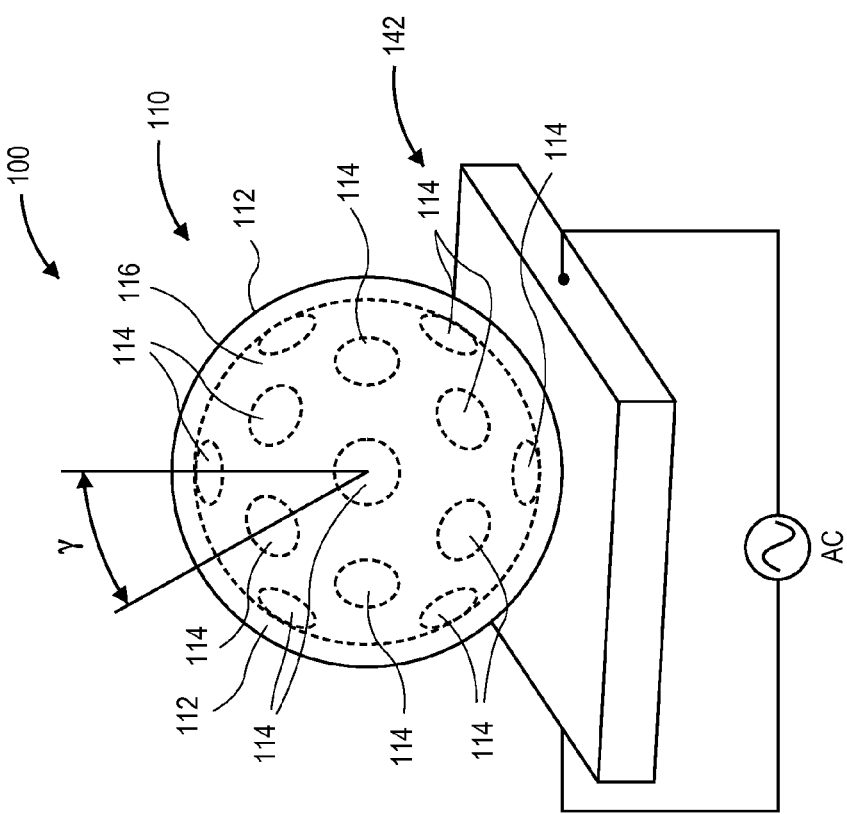

Referring to FIGS. 1A, 1B, 1C and 1D, components of one embodiment of a linear induction motor-driven divert mechanism 100 in accordance with embodiments of the present disclosure are shown. As is shown in FIG. 1A, the linear induction motor-driven divert mechanism 100 includes a spherical rotor 110 and an associated stator plate 142. The rotor 110 includes an outer layer 112 and a plurality of rotor slugs 114 embedded within an inner sphere 116. The rotor slugs 114 are uniformly distributed throughout the inner sphere 116 and separated from one another by an interior angle γ. The stator plate 142 is adapted to receive power from an AC power source.

The spherical rotor 110 may be formed from any suitable materials. For example, the inner sphere 116 may be formed from any paramagnetic materials that are suitably strong enough to mount and support the rotor slugs 114. Some such materials may include polyetheretherketone (or "PEEK") plastics, or like plastics. The rotor slugs 114 may be formed from any magnetic or ferrous materials, including iron, steel, nickel or one or more natural Earth or rare-Earth magnets. The outer layer 112 may be formed from any suitable paramagnetic material that provides a sufficient level and extent of friction to one or more objects passing in contact therewith, while durably and sufficiently protecting the rotor slugs 114 and the inner sphere 116. Those of ordinary skill in the pertinent art would recognize that any suitable materials may be used in the construction and operation of the linear induction motor-driven diverts of the present disclosure. Similarly, the stator plate 142 may be formed from any suitable conductive materials, such as copper or aluminum, and may be contained or shrouded in any suitable insulators or insulating materials.

FIG. 1B is a section view of the linear induction motor-driven divert mechanism 100 of FIG. 1A. As is shown in FIG. 1B, the rotor 110 includes eight rotor slugs 114 evenly and equidistantly distributed about an internal sphere defined by a radius from the center of the rotor 110. The rotor slugs 114 are separated by the interior angle γ. Although the rotor 110 of FIG. 1B includes eight rotor slugs 114 evenly distributed about a center of the inner sphere 116, thereby defining an interior angle γ of 45°, the linear induction motor-driven divert mechanisms 100 of the present disclosure are not so limited, and may employ any number of slugs 114 distributed about any interior angle γ in accordance with the present disclosure.

Figure 1C:
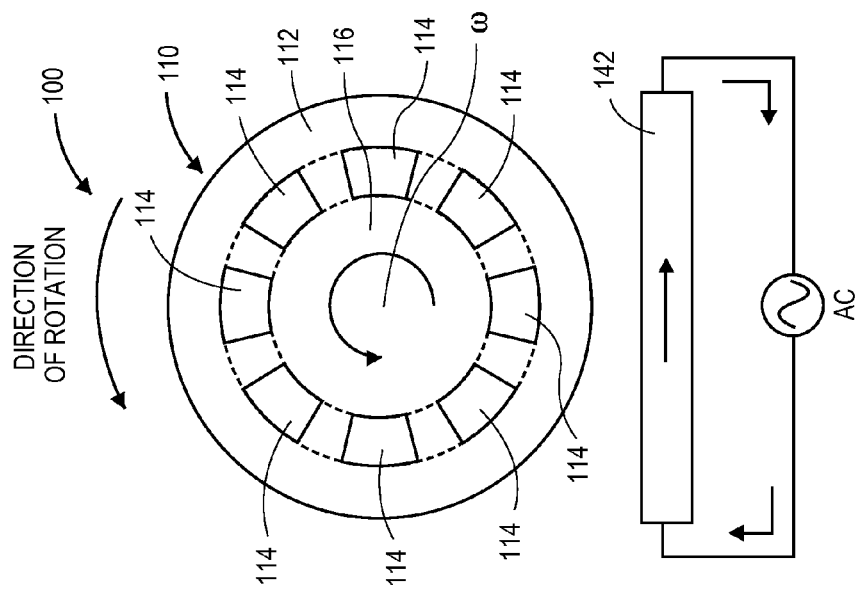
Figure 1D:
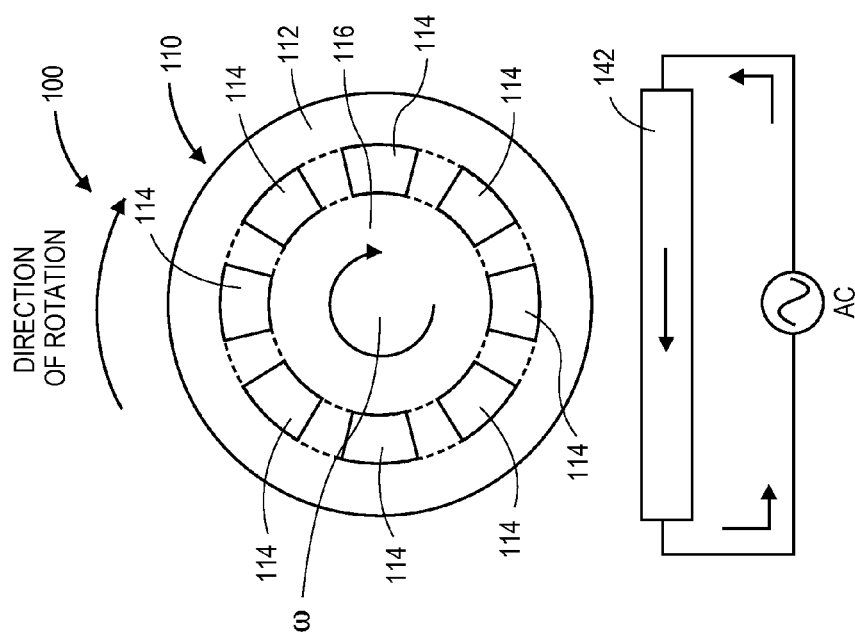

As is discussed above, upon an energization of the windings of a stator plate, a rotating magnetic field may be generated, and a spherical rotor having one or more magnetic or ferrous slugs may be caused to rotate in accordance with the rotating magnetic field. Referring to FIGS. 1C and 1D, the linear induction motor-driven divert mechanism 100 of FIGS. 1A and 1B is shown. As is shown in FIG. 1C, an alternating current in a first polarization or direction is applied to the stator plate 142 from an AC power source, thereby creating a first rotating magnetic field that causes the rotor 110 to rotate in a first direction of rotation about an axis passing through a center of the rotor 110, and at a first angular velocity ω. Conversely, as is shown in FIG. 1D, when an alternating current in a second polarization or direction (viz., an opposite direction to the first polarization or direction) is applied to the stator plate 142 from the AC power source, a second rotating magnetic field is created. The second rotating magnetic field causes the rotor 110 to rotate in a second direction of rotation, i.e., in an opposite direction, about the axis, and at a second angular velocity w.

Thus, as is shown in FIGS. 1C and 1D, the directions of rotation of the rotor 110 of FIGS. 1A and 1B may be controlled by manipulating the polarization of AC current flow applied to the stator plate 142. Moreover, as is discussed above, because the synchronous speed is defined as a function of the frequency applied to the stator plate, and because an induction motor rotor attempts to operate at, but does not reach, the synchronous speed, the operating speed (viz., the angular velocity) of the rotor 110 may be controlled by varying the frequency of the AC current flow applied to the stator plate 142.

Furthermore, although FIG. 1C and FIG. 1D depict the application of current to the stator plate 142 in opposite polarization, such that magnetic fields rotating in opposite directions about a common axis may be created, the systems and methods are not so limited. Rather, current may be applied to a stator plate 142, or to one or more stator plates 142, in any polarization, and at any frequency, and may thus cause the corresponding rotor 110 to rotate about any axis, and at any angular velocity, in accordance with the systems and methods of the present disclosure, as the stator plate 142 may be defined and constructed to allow for current flow along any number of axes or in any number of polarizations. For example, according to some embodiments of the present disclosure, a conducting system and/or a linear induction motor-driven divert mechanism may include a variable frequency drive controller for each stator plate corresponding to a spherical rotor, or for multiple stator plates, for the purpose of modifying the frequency of the current applied to the stator plate or stator plates and, therefore, the rate of rotation of the corresponding spherical rotor or spherical rotors.

Moreover, the stator plate 142 may include a first plurality of conductors that are aligned to receive current flow along a first axis, and in either direction. The stator plate 142 may further include a second plurality of conductors that are aligned to receive current flow along a second axis, and in either direction, wherein the second axis may be different (e.g., perpendicular, or along another non-coaxial orientation) from the first axis. In this regard, a first rotation of the rotor 110 may be caused by applying a current to the first plurality of conductors, and a second rotation of the rotor 110 may be caused by applying a current to the second plurality of conductors. Currents may be applied to both the first plurality of conductors and the second plurality of conductors in different amounts or frequencies, thereby creating a magnetic field that causes a third rotation of the rotor 110 in a direction or speed that differs from that of either the first rotation or the second rotation. A stator plate 142 having any number of conductors aligned in any number of directions or along any number of axes may be provided in accordance with the present disclosure.

The linear induction motor-driven diverts of the present disclosure, such as the linear induction motor-driven divert 110 of FIGS. 1A-1D, may be installed within one or more mounting frames or systems and incorporated into or associated with a conveying system. Referring to FIGS. 2A-2C, components of another embodiment of a linear induction motor-driven divert mechanism 200 in accordance with embodiments of the present disclosure are shown. Except where otherwise noted, reference numerals preceded by the number "2" in FIG. 2A, 2B or 2C indicate components or features that are similar to components or features having reference numerals preceded by the number "1" shown in FIGS. 1A-1D.

FIG. 2A shows a perspective view of a linear induction motor-driven divert mechanism 200, including a plurality of spherical rotors 210 arranged in an array, an upper frame 220, a nesting table 230 and a power table 240. The linear induction motor-driven divert mechanism 200 includes nine rotors 210 arranged in a three-by-three (3×3) array which are mounted between the upper frame 220 and upon the nesting table 230. The upper frame 220 may include a hole or opening for receiving each of the rotors 210, and may be formed from any suitable material. Preferably, the upper frame 220 is formed from a paramagnetic material, such as the same paramagnetic material from which the outer layer or the inner sphere from which the rotors 210 are formed, although any suitable material may be used. Similarly, the nesting table 230 may further include one cavity for each of the rotors 210. Each of the cavities may define a spherical section shaped to conform to the external surfaces of the spherical rotors 210.

Beneath the nesting table 230, the power table 240 comprises a plurality of stator plates 242 (not shown), with one stator plate 242 mounted beneath each of the rotors 210. Therefore, because the linear induction motor-driven divert mechanism 200 of FIG. 2A includes nine separate rotors 210, the power table 240 includes nine stator plates 242, each of which may be individually energized to cause one of the rotors 210 to independently rotate about a selected axis and in a selected direction at a selected angular velocity. The direction and angular velocity of the rotation of the rotors may be defined by controlling the direction and frequency of current applied to the corresponding stator plate 242 for each rotor 210, such as by providing a variable frequency drive controller associated with one or more of the stator plates 242.

The linear induction motor-driven divert mechanism 200 of FIG. 2A may be installed within or associated with a conveying system. For example, the linear induction motor-driven divert mechanism 200 may be installed in series with one or more conveyor belts or other conveying apparatuses, such that objects being conveyed upon an ingress conveyor belt or other apparatus may pass along and above upper surfaces of the rotors 210. Thus, the linear induction motor-driven divert mechanism 200 may be configured such that the upper surfaces of the rotors 210 are substantially coplanar with an ingress conveyor belt or other apparatus, thereby enabling such a belt or apparatus to receive objects from the ingress conveyor belt or apparatus, and to further transfer the objects in a direction and at a speed consistent with the direction of rotation and the angular velocity of the rotating rotors 210, which may be defined at least in part by the direction and frequency of current applied to stator plates 242 associated with the rotating rotors 210. The objects may be transferred to any egress apparatus, including but not limited to another conveyor belt, as well as a bin, a chute, a cart or a truck.

FIG. 2B shows a top view of the linear induction motor-driven divert mechanism 200 of FIG. 2A. The linear induction motor-driven divert mechanism 200 includes the nine rotors 210 arranged in a three-by-three (3×3) array, as well as the upper frame 220. Although the rotors 210 of FIG. 2B are shown in the three-by-three (3×3) array, the linear induction motor-driven divert mechanisms of the present disclosure may feature any number of rotors, configured in any type of arrangement, and are not limited to rotors 210 arranged in three-by-three (3×3) arrays, arrays having nine rotors 210, or rotors 210 arranged in a square array. Those of ordinary skill in the pertinent art will recognize that any number of rotors may be arranged in arrays of any number or size in accordance with the present disclosure.

FIG. 2C shows a side view of the linear induction motor-driven divert mechanism of FIGS. 2A and 2B. As is shown in FIG. 2C, an upper portion of each of the rotors 210 extends through the corresponding holes of the upper frame 220, and a lower portion of each of the rotors 210 rests within the cavities defined by the nesting table 230. Each of the cavities may include any form of low-friction device for facilitating the rotation of the rotors 210 therein, including an O-ring, a Teflon-seated ring, or a bearing apparatus.

Figure 3:
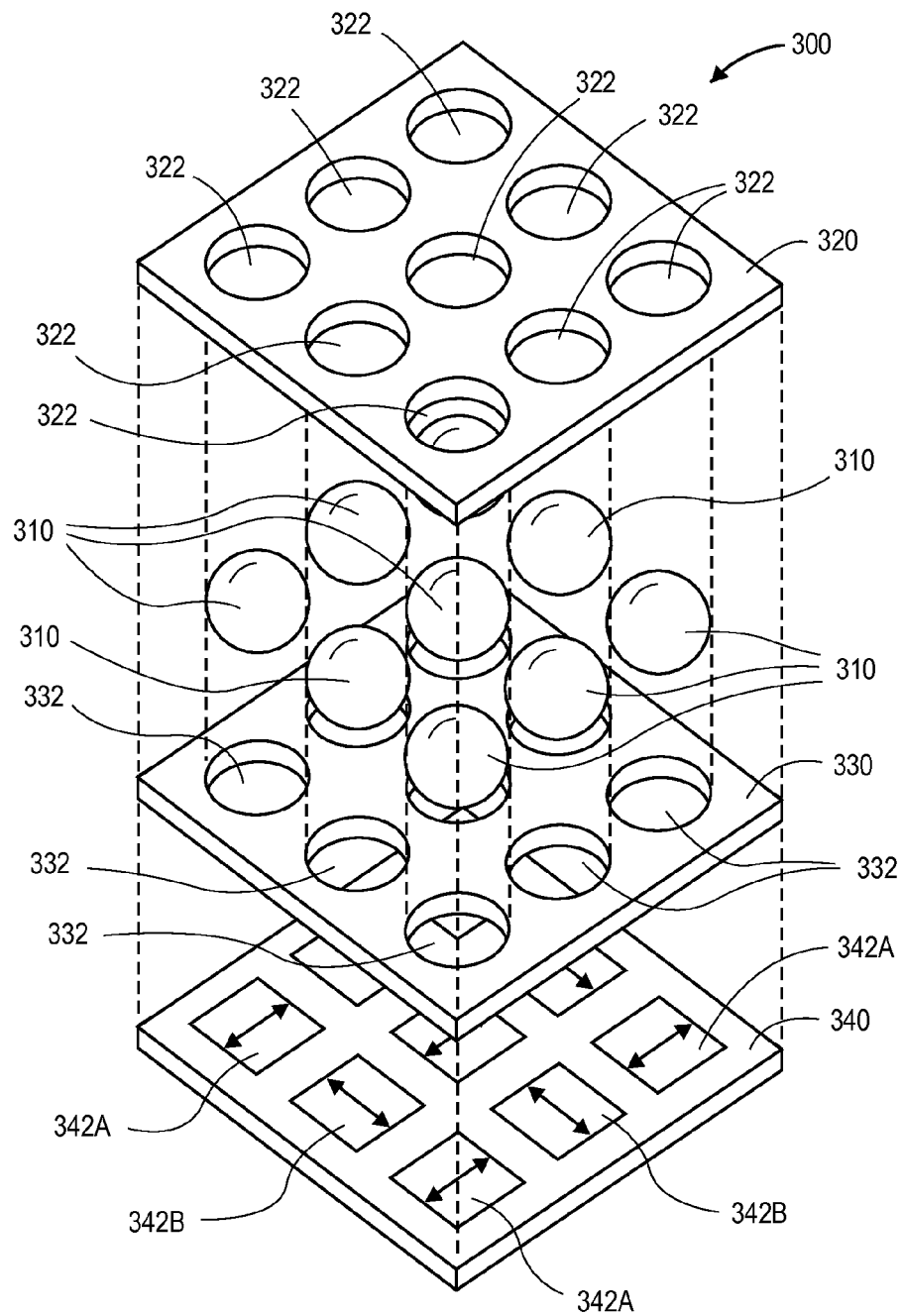
FIG. 3 shows components of one embodiment of a linear induction motor-driven divert mechanism, in accordance with embodiments of the present disclosure.

As is discussed above, a linear induction motor-driven divert mechanism of the present disclosure may include stators having conductors or defining conductive paths in any number or type of orientation, such that an application of current flow to the stators generates an individual magnetic field that causes the rotor corresponding to the stator to which the current has been applied to rotate. Referring to FIG. 3, components of another embodiment of a linear induction motor-driven divert mechanism 300 in accordance with embodiments of the present disclosure are shown. Except where otherwise noted, reference numerals preceded by the number "3" in FIG. 3 indicate components or features that are similar to components or features having reference numerals preceded by the number "2" in FIG. 2A, 2B or 2C, or the number "1" shown in FIGS. 1A-1D.

FIG. 3 shows an exploded view of the linear induction motor-driven divert mechanism 300, showing the arrangement of rotors 310A, 310B within an upper frame 320 and a nesting table 330, above a power table 340. The upper frame 320 includes a plurality of openings 322 for accommodating the various rotors 310A, 310B.

Additionally, the power table 340 includes a plurality of stator plates 342A, 342B in alternating orientations for perpendicular current flow. Therefore, by energizing the stator plates 342A, each of the rotors 310A corresponding to the stator plates 342A will rotate in a given direction and about a common axis, or about axed that are parallel to one another. By energizing the stator plates 342B, each of the rotors 310B corresponding to the stator plates 342B will rotate in a given direction and about a common axis, or about axes that are parallel to one another, are perpendicular to the axes about which the rotors 310A will rotate upon the energization of the sensor plates 342A.

Therefore, by installing one or more of the linear induction motor-driven divert mechanisms 300 of FIG. 3 within a conveyor system, one or more objects may be caused to travel over the linear induction motor-driven divert mechanisms 300 at a given velocity (i.e., in a direction and at a speed) defined by the axes of rotation and angular velocities of one or more of the rotors 310A, 310B. The velocity of the objects passing over the linear induction motor-driven divert mechanisms 300 may be determined by summing vectors corresponding to the rotation of the individual rotors 310, which may further be determined based on the directions and frequencies of current flow through each of the stator plates 342A, 342B.

Figure 4:
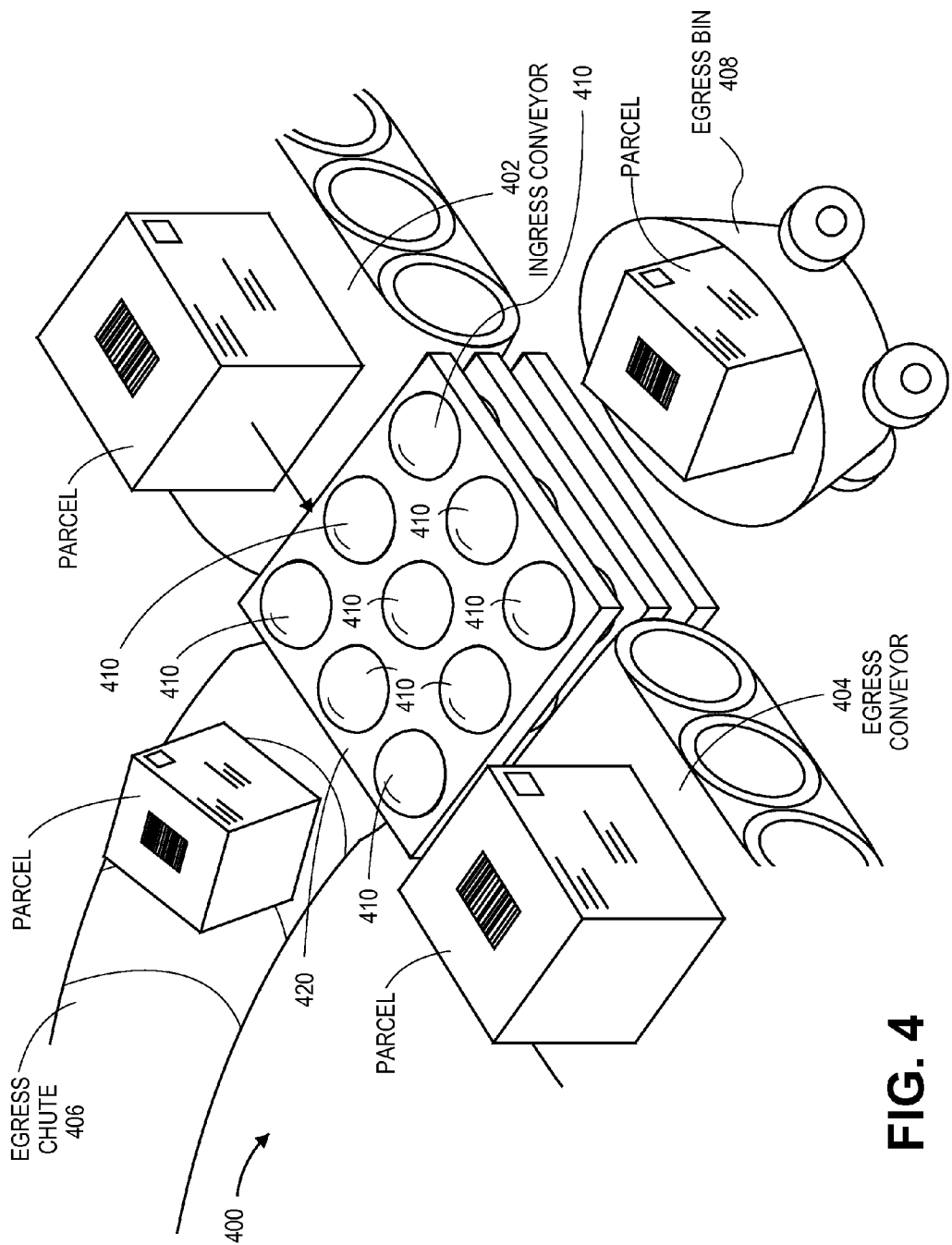
FIG. 4 shows components of one conveying system including one embodiment of a linear induction motor-driven divert mechanism, in accordance with embodiments of the present disclosure.

As is discussed above, objects such as items, materials or parcels may pass from an ingress apparatus (e.g., a conveyor belt) onto and over one or more rotating rotors of a linear induction motor-driven divert mechanism of the present disclosure, to one or more egress apparatuses, which may include a conveyor belt or any other apparatus for receiving or accepting items, materials or parcels from a divert. Referring to FIG. 4, components of another embodiment of a linear induction motor-driven divert mechanism 400 in accordance with embodiments of the present disclosure are shown. Except where otherwise noted, reference numerals preceded by the number "4" in FIG. 4 indicate components or features that are similar to components or features having reference numerals preceded by the number "3" in FIG. 3, the number "2" in FIG. 2A, 2B or 2C, or the number "1" shown in FIGS. 1A-1D.

As is shown in FIG. 4, the linear induction motor-driven divert mechanism 400 may receive objects, such as parcels, from an ingress conveyor belt 402, and may transfer such objects or parcels to one or more egresses, such as the egress conveyor belt 404, the egress chute 406 or the egress bin 408. The items arriving from the ingress conveyor belt 402 may pass over the rotating rotors 410 of the linear induction motor-driven divert mechanism 400, and onto an egress conveyor belt 404, which may be oriented or positioned consistent with the direction of rotation of the rotors 410. For example, the linear induction motor-driven divert mechanism 400 of FIG. 4 is shown with the egress conveyor belt 404 being aligned substantially coaxially with the ingress conveyor belt 402. Therefore, if current is applied to the stator plates of the linear induction motor-driven divert mechanism 400 to cause the rotors 410 to rotate in a forward direction, a parcel passing over the rotors 410 will travel forward to the egress conveyor belt 404. If current is applied to the stator plates of the linear induction motor-driven divert mechanism 400 to cause the rotors to rotate in a lateral direction, i.e., to a right direction or a left direction with respect to the forward direction of the ingress conveyor belt 402, a parcel passing over the rotors 410 will travel to the egress chute 406 or the egress bin 408, respectively.

Those of ordinary skill in the pertinent art will recognize that an egress conveyor apparatus, such as the egress conveyor belt 404, the egress chute 406 or the egress bin 408 of FIG. 4, may be positioned in any orientation or along any axis of orientation with respect to an ingress conveyor apparatus, such as the ingress conveyor belt 402 of FIG. 4. The linear induction motor-driven divert mechanisms of the present disclosure, such as the linear induction motor-driven divert mechanism 400 of FIG. 4, may be configured to cause objects received from the ingress conveyor apparatus to travel toward and onto the egress conveyor apparatus by determining a sufficient amount of current to be applied to stator plates associated with one or more spherical rotors, such as the rotors 410 of FIG. 4, in a given direction and at certain frequencies, with the net effect of directing objects passing onto such rotors in a desired direction and at a desired speed. Therefore, to cause objects to travel in the desired direction or at the desired speed, the current may be applied to the stator plates, and the rotors may rotate accordingly.

Figure 5:
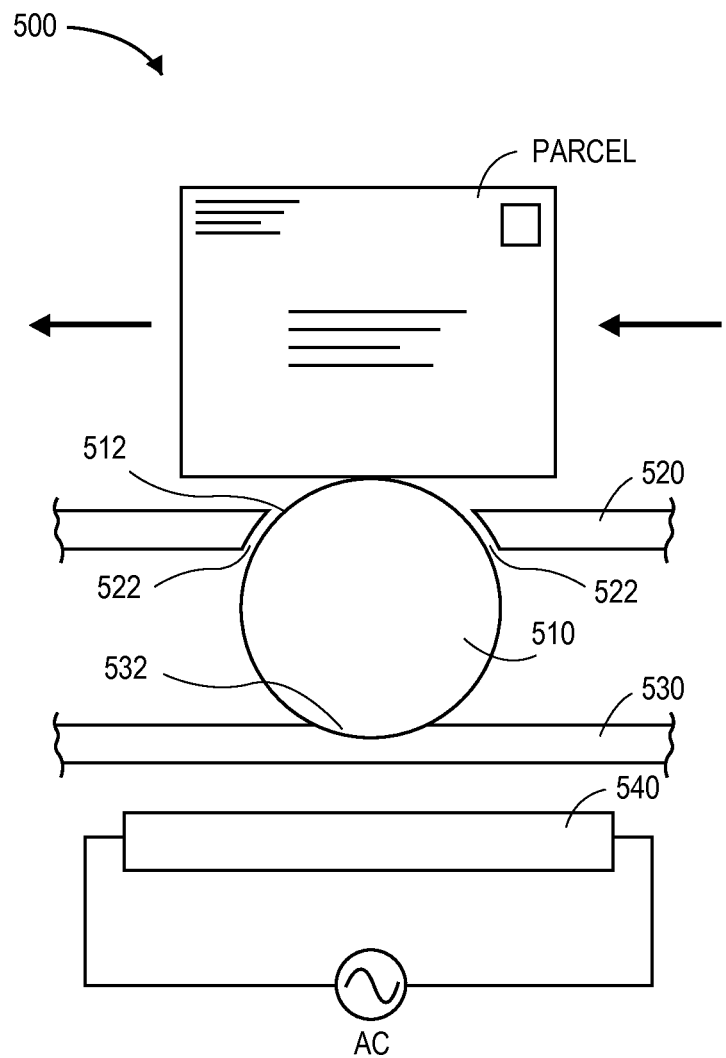
FIG. 5 shows components of one embodiment of a linear induction motor-driven divert mechanism, in accordance with embodiments of the present disclosure.

As is discussed above, the linear induction motor-driven diverts of the present disclosure may cause an object to travel in a desired direction or at a desired speed by causing a rotation of one or more spherical rotors, which may then impart motion to an object passing thereon. Referring to FIG. 5, components of one embodiment of a linear induction motor-driven divert mechanism 500 in accordance with embodiments of the present disclosure are shown. Except where otherwise noted, reference numerals preceded by the number "5" in FIG. 5 indicate components or features that are similar to components or features having reference numerals preceded by the number "4" in FIG. 4, the number "3" in FIG. 3, the number "2" in FIG. 2A, 2B or 2C, or the number "1" shown in FIGS. 1A-1D.

As is shown in FIG. 5, the linear induction motor-driven divert mechanism 500 includes a rotor 510, an upper frame 520, a nesting table 530 and a power table 540 connected to an AC power source. The rotor 510 is shown as mounted between the opening 522 of the upper frame 520 and the cavity 532 of the nesting table 530.

As is discussed above, the rotor 510 may be caused to rotate by energizing the stator plate 540 with current at a specific frequency, which generates a magnetic field that causes the rotor 510 to rotate in a given direction between the opening 522 of the upper frame 520 and the cavity 532 of the nesting table 530. When an object (viz., a parcel) passing over a linear induction motor-driven divert mechanism of the present disclosure, such as the linear induction motor-driven divert mechanism 500 of FIG. 5, makes contact with the rotating rotor 510 and/or the upper frame 520, motion is imparted to an object passing over the rotor 510 by static friction between a portion of an outer surface of the rotor 510 and the object. Therefore, the materials used to form the rotor 510, the upper frame 520 and/or the nesting table 530 may be selected to maximize the static friction of an outer layer of the rotor 510 and the materials of the objects intended to pass over the linear induction motor-driven divert mechanism 500, and to minimize the kinetic friction of the outer layer of the rotor 510 and the opening 522 of the upper frame 520 or the cavity 532 of the nesting table 530. In particular, the kinetic friction between the rotor 510 and the opening 522 of the upper frame 520 and the cavity 532 of the nesting table 530 should be sufficiently minimized to permit the rotor 510 to rotate freely.

Figure 6A:
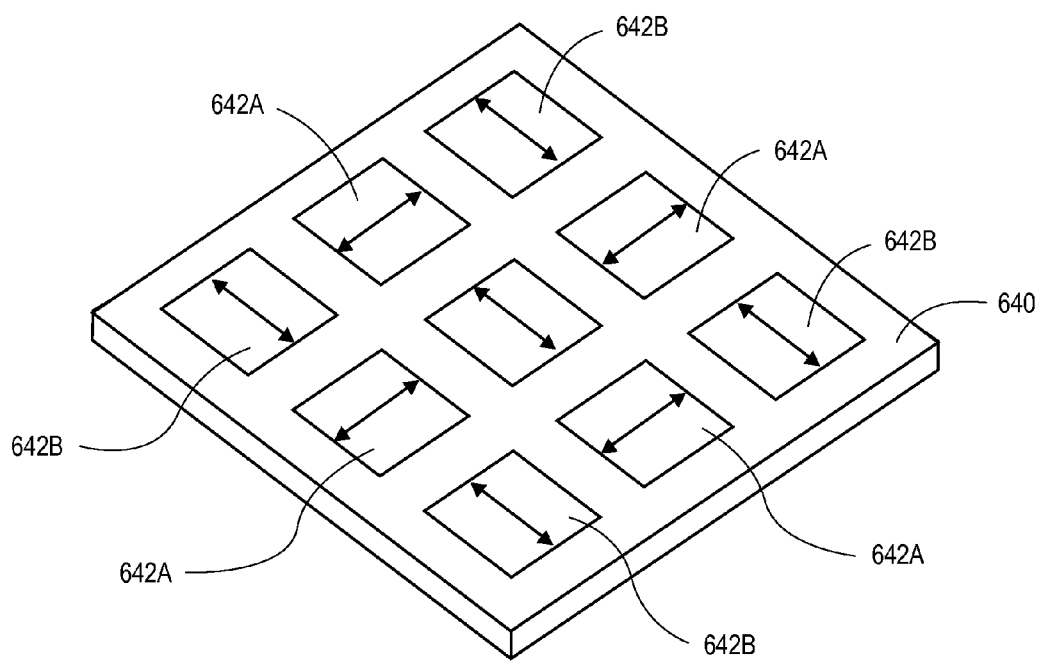
FIGS. 6A, 6B and 6C show components of one embodiment of a linear induction motor-driven divert mechanism, in accordance with embodiments of the present disclosure.
Figure 6B:
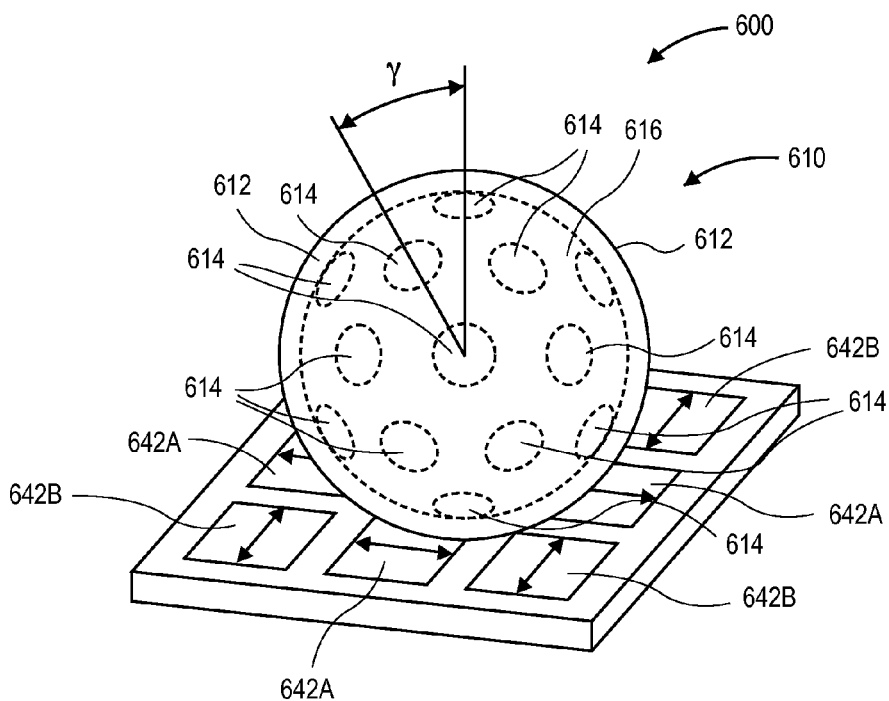
Figure 6C:
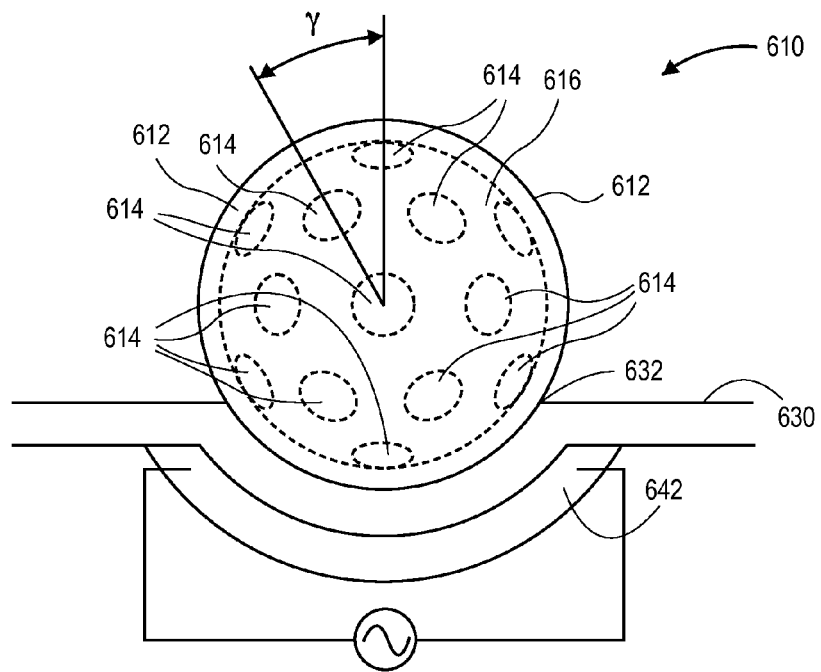

As is discussed above, those of ordinary skill in the pertinent art would recognize that the direction and speed of travel of objects passing onto one or more rotors of a linear induction motor-driven divert mechanism of the present disclosure may be determined by controlling the frequency and direction of current applied to the stator plates associated with the one or more rotors. Referring to FIGS. 6A, 6B and 6C, components of one embodiment of a linear induction motor-driven divert mechanism in accordance with embodiments of the present disclosure are shown. Except where otherwise noted, reference numerals preceded by the number "6" in FIG. 6A, 6B or 6C indicate components or features that are similar to components or features having reference numerals preceded by the number "5" in FIG. 5, the number "4" in FIG. 4, the number "3" in FIG. 3, the number "2" in FIG. 2A, 2B or 2C, or the number "1" shown in FIGS. 1A-1D.

Referring to FIG. 6A, a power table 640 having a plurality of stator plates 642A, 642B arranged in alternating perpendicular orientations of current flow is shown. For example, as is shown in FIG. 6A, the stator plates 642A are adapted to receive current flow along an axis that is perpendicular to the axes by which the stator plates 642B are adapted to receive current flow. Thus, where the power table 640 is utilized in a linear induction motor-driven divert mechanism of the present disclosure, current may be individually applied to one or more of the stator plates 642A, 642B to selectively cause each of the associated rotors to rotate about axes that are perpendicular to one another. For example, if motion at a high speed, or a significant change in direction are desired, then several of the stator plates 642A, 642B may be energized with current in a given direction or at a desired frequency. If motion at a low speed or a minor change in direction are desired, then one or a small number of the stator plates 642A, 642B may be energized. A net effect of the rotations of one or more rotors may be summed and represented in a vector indicative of the resulting velocity of objects passing over such rotors.

The power table 640 and the stator plates 642A, 642B of FIG. 6A may be provided as one or more components of a divert mechanism in accordance with the present disclosure. Referring to FIG. 6B, components of a linear induction motor-driven divert mechanism 600 are shown. As is shown in FIG. 6B, the linear induction motor-driven divert mechanism 600 includes a spherical rotor 610 and a power table 640 having a plurality of stator plates 642A, 642B. The rotor 610 includes an outer layer 612 and a plurality of rotor slugs 614 embedded within an inner sphere 616. The rotor slugs 614 are uniformly distributed throughout the inner sphere 616 and separated from one another by an interior angle γ. The power table 640 may be adapted to receive power from an AC power source, and to transfer power to one or more of the stator plates 642A, 642B accordingly.

Furthermore, although the power table 640 and the stator plates 642A, 642B of FIGS. 6A and 6B are shown as having substantially flat shapes, the systems and methods of the present disclosure are not so limited. Rather, the power table 640 and/or the stator plates 642A, 642B, or any other stator components of a linear induction motor-driven divert mechanism, may take any relevant or appropriate shape in accordance with the present disclosure. Referring to FIG. 6C, a linear induction motor-driven divert mechanism 600 is shown. As is shown in FIG. 6B, the linear induction motor-driven divert mechanism 600 includes a spherical rotor 610, a nesting table 630 and a power table 640 having a stator plate 642. The nesting table 630, the power table 640 and the stator plate 642 of FIG. 6C are shaped in the form of a spherical cap or other spherical section, in order to conform with the shape of the spherical rotor 610. By providing a linear induction motor-driven divert mechanism 600 having components with substantially spherically shaped sections, a distance separating the stator and the rotor, viz., the stator plate 642 and the spherical rotor 610, may be minimized, thereby maximizing the effectiveness of the magnetic flux generated in the stator, or changes to the magnetic flux generated in the stator, in causing or changing rotation of the spherical rotor 610.

The potential of some embodiments of the present disclosure to customize the velocities of objects passing over a linear induction motor-driven divert mechanism of the present disclosure may be shown in connection with FIGS. 7A, 7B, 7C and 7D. Except where otherwise noted, reference numerals preceded by the number "7" in FIGS. 7A, 7B, 7C and 7D indicate components or features that are similar to components or features having reference numerals preceded by the number "6" in FIG. 6A, 6B or 6C, the number "5" in FIG. 5, the number "4" in FIG. 4, the number "3" in FIG. 3, the number "2" in FIG. 2A, 2B or 2C, or the number "1" shown in FIGS. 1A-1D.

Figure 7A:
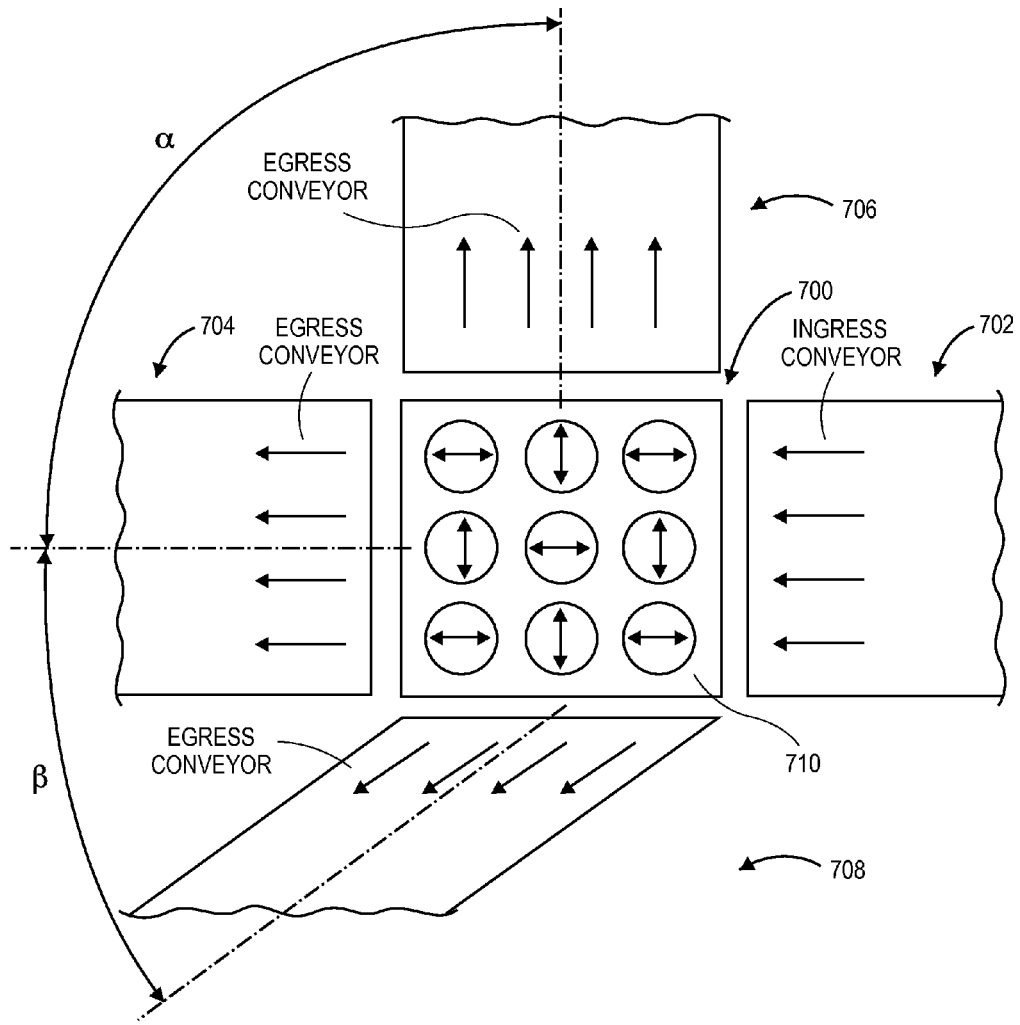
FIGS. 7A, 7B, 7C and 7D show components of one embodiment of a linear induction motor-driven divert mechanism, in accordance with embodiments of the present disclosure.

FIG. 7A shows a linear induction motor-driven divert mechanism 700 having an ingress conveyor 702 and egress conveyors 704, 706, 708, as well as a plurality of spherical rotors 710. The egress conveyor 704 of FIG. 7A is oriented substantially coaxially with the ingress conveyor 702, while the egress conveyor 706 is oriented at an angle α with respect to an axis of orientation of the ingress conveyor 702, and the egress conveyor 708 is oriented at an angle β to the axis of orientation of the ingress conveyor 702.

Figure 7B:
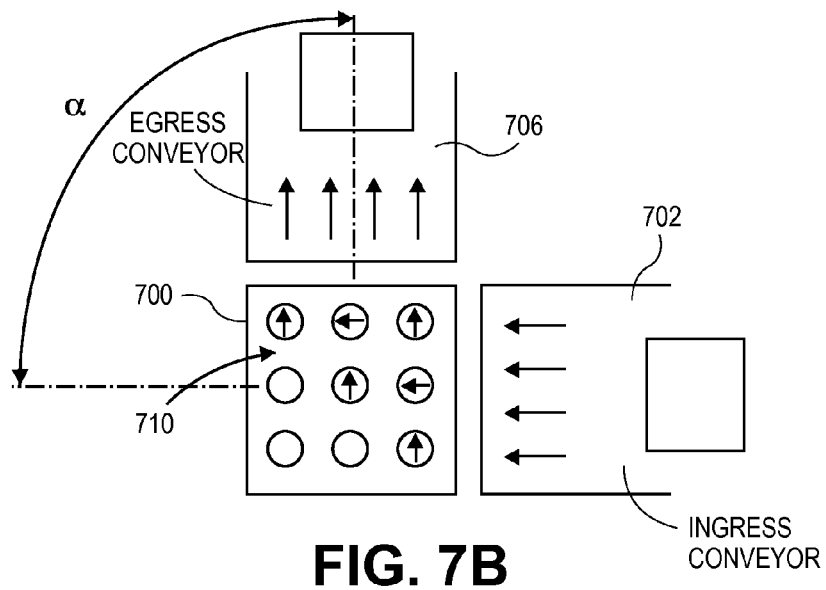

As is discussed above, where a linear induction motor-driven divert mechanism of the present disclosure is applied to a conveyor system, the rotations of individual rotors 710 may be individually controlled by applying current in specific directions and at given frequencies, such that objects passing over the rotors 710 of the linear induction motor-driven divert mechanism may be caused to travel in any direction and at any speed. Referring to FIG. 7B, the linear induction motor-driven divert mechanism 700 of FIG. 7A is shown. By energizing one or more of the stator plates (not shown) of the linear induction motor-driven divert mechanism 700 of FIG. 7B, some of the rotors 710 may rotate in directions which cause objects passing onto such rotors 710 to travel along an axis oriented at an angle α with respect to the axis of orientation of the ingress conveyor 702, i.e., in a direction that is substantially perpendicular to the axis of orientation of the ingress conveyor 702, and toward egress conveyor 706, as are shown in FIG. 7B.

Figure 7C:
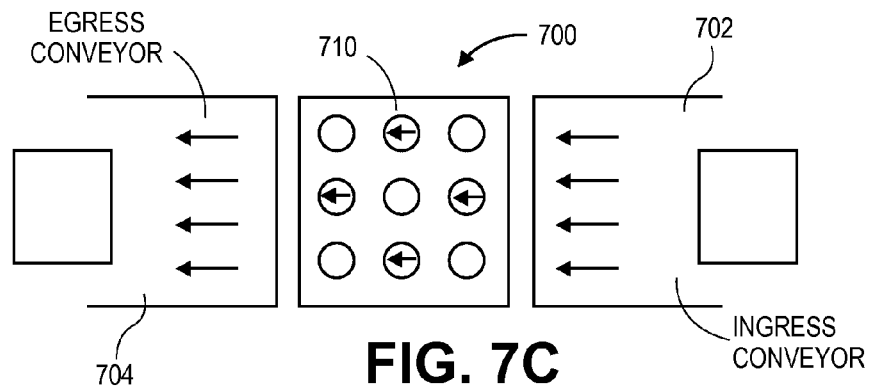
Figure 7D:
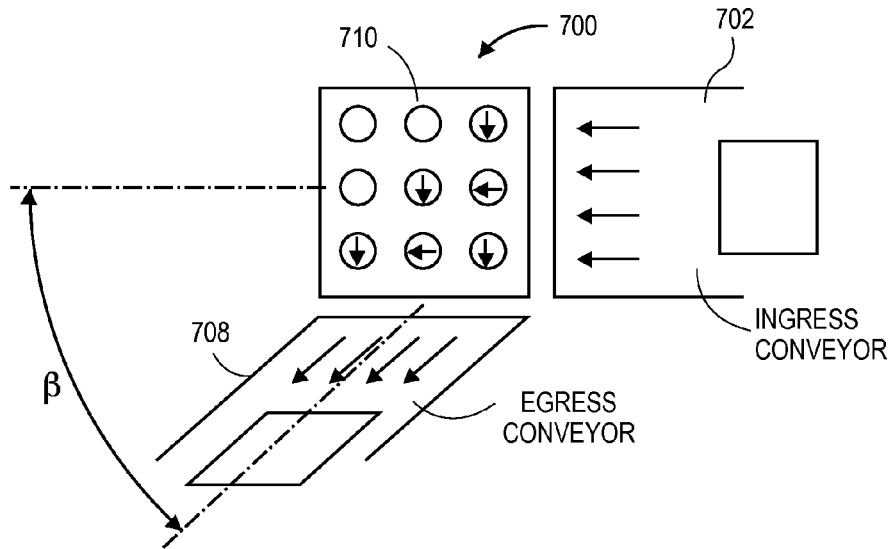

Similarly, referring to FIG. 7C, some of the stator plates (not shown) of the linear induction motor-driven divert mechanism 700 may be energized to rotate of some of the rotors 710 in directions which cause objects passing onto such rotors to travel along an axis that is oriented parallel to or along the axis of orientation of the ingress conveyor 702, i.e., in a direction toward egress conveyor 704. Referring to FIG. 7D, some of the stator plates (not shown) of the linear induction motor-driven divert mechanism 700 may be energized to rotate some of the rotors 710 in directions which cause objects passing onto such rotors 710 to travel along an axis oriented at an angle β with respect to the axis of orientation of the ingress conveyor 702, and toward egress conveyor 706. Accordingly, objects arriving at the linear induction motor-driven divert mechanisms 700 of FIG. 7A may be caused to travel in the directions of the egress conveyors 704, 702, 706, respectively, based on the respective rotations of underlying rotors 710 that may be caused by the energization of stator plates (not shown) as is shown in FIGS. 7B, 7C and 7D.

Linear induction motor-driven divert mechanisms of the present disclosure may utilize stator plates having multiple orientations of conductors or windings therein, which may be used to cause spherical rotors to rotate about multiple axes. Moreover, although the stator plates 642A, 642B of FIGS. 6A and 6B are shown as having square cross-sections and as arranged in an array or grid, the systems and methods are not so limited, and may feature stator plates having any shape, e.g., round, and may be arranged in layouts having any shape, in accordance with the present disclosure. Furthermore, as is shown in FIGS. 7B, 7C and 7D, the systems and methods disclosed herein may be used to cause an object to travel in any direction and at any speed, and to further cause any change in a velocity of an object in a conveyor system, such as by increasing a speed of the object, or by changing a direction of the object.

Referring to FIGS. 8A, 8B, 8C and 8D, components of linear induction motor-driven divert mechanisms 800 are shown. Except where otherwise noted, reference numerals preceded by the number "8" in FIGS. 8A, 8B, 8C and 8D indicate components or features that are similar to components or features having reference numerals preceded by the number "7" in FIGS. 7A, 7B, 7C and 7D, the number "6" in FIG. 6A, 6B or 6C, the number "5" in FIG. 5, the number "4" in FIG. 4, the number "3" in FIG. 3, the number "2" in FIG. 2A, 2B or 2C, or the number "1" shown in FIGS. 1A-1D.

Figure 8A:
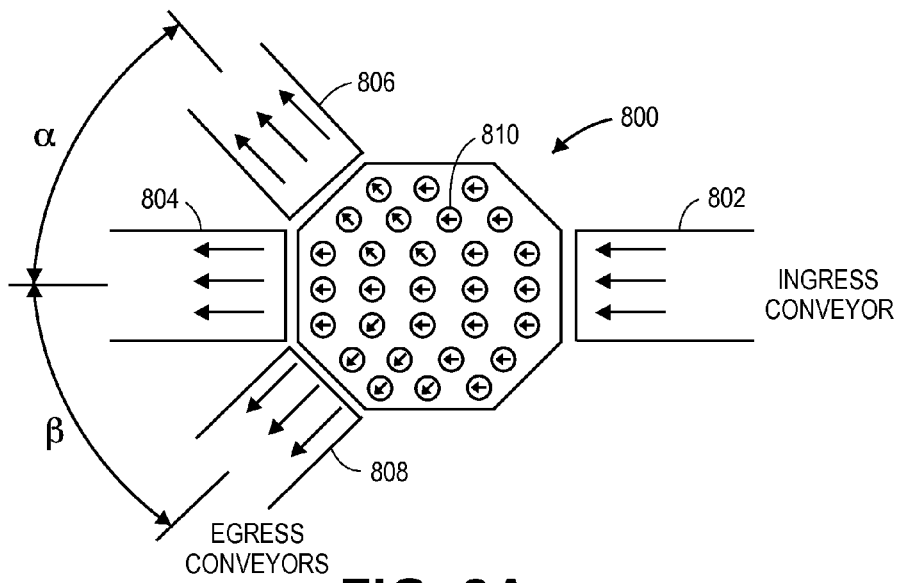
FIGS. 8A, 8B, 8C and 8D show components of one embodiment of a linear induction motor-driven divert mechanism, in accordance with embodiments of the present disclosure.
Figure 8B:
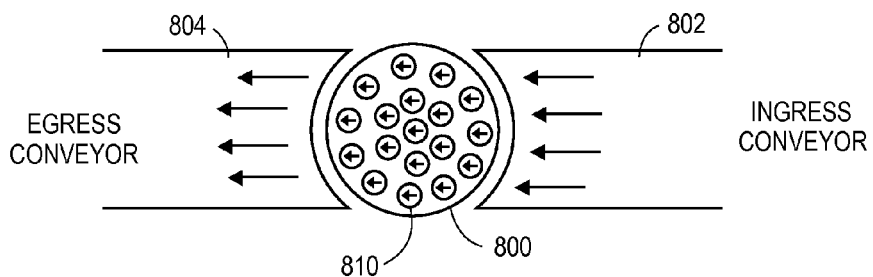

As is shown in FIG. 8A, the linear induction motor-driven divert mechanism 800 includes an ingress conveyor 802, egress conveyors 804, 806, 808, and a plurality of spherical rotors 810 arranged in a substantially octagonal layout. The egress conveyor 804 of FIG. 8A is oriented substantially coaxially with the ingress conveyor 802, while the egress conveyor 806 is oriented at an angle α with respect to an axis of orientation of the ingress conveyor 802, and the egress conveyor 808 is oriented at an angle β to the axis of orientation of the ingress conveyor 802. Accordingly, one or more of the spherical rotors 810 may be individually or collectively rotated in directions which would cause objects passing over such rotors 810 to travel in directions corresponding to the egress conveyors 804, 806, 808, respectively. The directions of rotation of the rotors 810 could be caused or changed by applying or varying the amounts or frequencies of current applied to individual stator plates (not shown) associated with such rotors 810 at one or more various times. Similarly, referring to FIG. 8B, the linear induction motor-driven divert mechanism 800 includes an ingress conveyor 802, an egress conveyor 804 and a plurality of spherical rotors 810 arranged in a substantially circular layout.

Figure 8C:
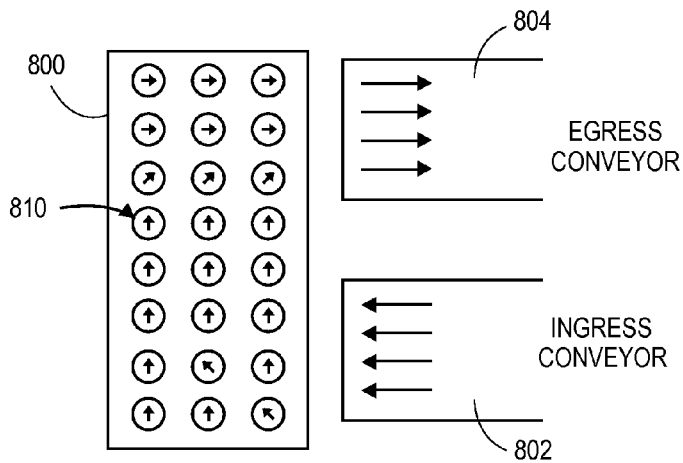

Additionally, the linear induction motor-driven divert mechanisms of the present disclosure may further cause an object to reverse course. Referring to FIG. 8C, the linear induction motor-driven divert mechanism includes an ingress conveyor 802, an egress conveyor 804 and a plurality of spherical rotors 810 arranged in a substantially rectangular layout. As is shown in FIG. 8C, by varying the amounts or frequencies of current applied to individual stator plates (not shown) associated with such rotors 810 at one or more various times. In this regard, the rotors 810 may cause objects passing over the rotors 810 to travel from the ingress conveyor 802 to the egress conveyor 804, even where the egress conveyor 804 is aligned with an axis of orientation that is substantially parallel to an axis of orientation of the ingress conveyor 802, but in an opposite direction.

Figure 8D:
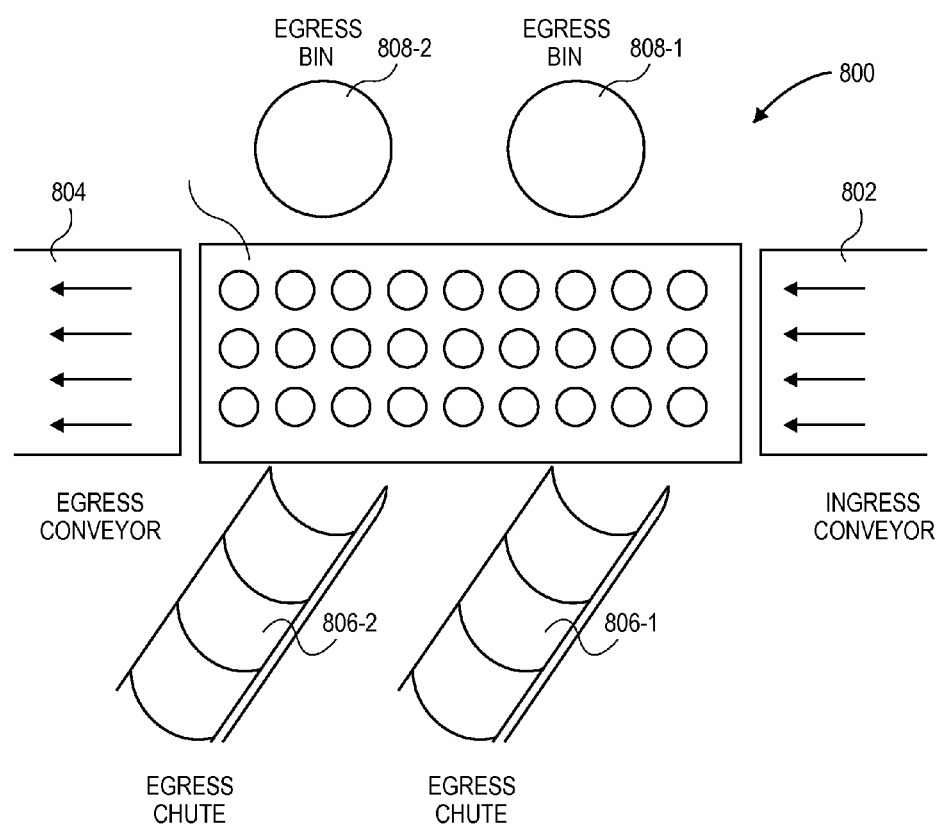

By selectively energizing one or more stator plates at various times, spherical rotors may be caused to rotate independently, or in concert, in order to cause objects passing along a linear induction motor-driven divert mechanism of the present disclosure to travel in one or more preferred directions. Referring to FIG. 8D, the linear induction motor-driven divert mechanism includes an ingress conveyor 802, an egress conveyor 804, egress chutes 806-1, 806-2 and egress bins 808-1, 808-2, and a plurality of spherical rotors 810 arranged in a substantially rectangular layout. The egress conveyor 804 is aligned substantially coaxially with respect to the ingress conveyor 802, while the egress chutes 806-1, 806-2 and the egress bins 808-1, 808-2 are aligned along axes of orientation which diverge from an axis of orientation of the ingress conveyor 802 at various points.

Those of ordinary skill in the pertinent art will recognize that the rotors 810 of FIG. 8D may be selectively rotated to cause objects to travel from the ingress conveyor 802 to either the egress conveyor 804, i.e., where some or all of the rotors 810 are rotated in directions corresponding to the axes of orientation of the ingress conveyor 802 or the egress conveyor 804, respectively. Alternatively, the rotors 810 may be selectively rotated to cause objects to travel from the ingress conveyor 802 along some of the rotors 810 and to be deposited into the egress chute 806-1, the egress chute 806-2, the egress bin 808-1 or the egress bin 808-2, as may be desired for a particular application.

Figure 9:
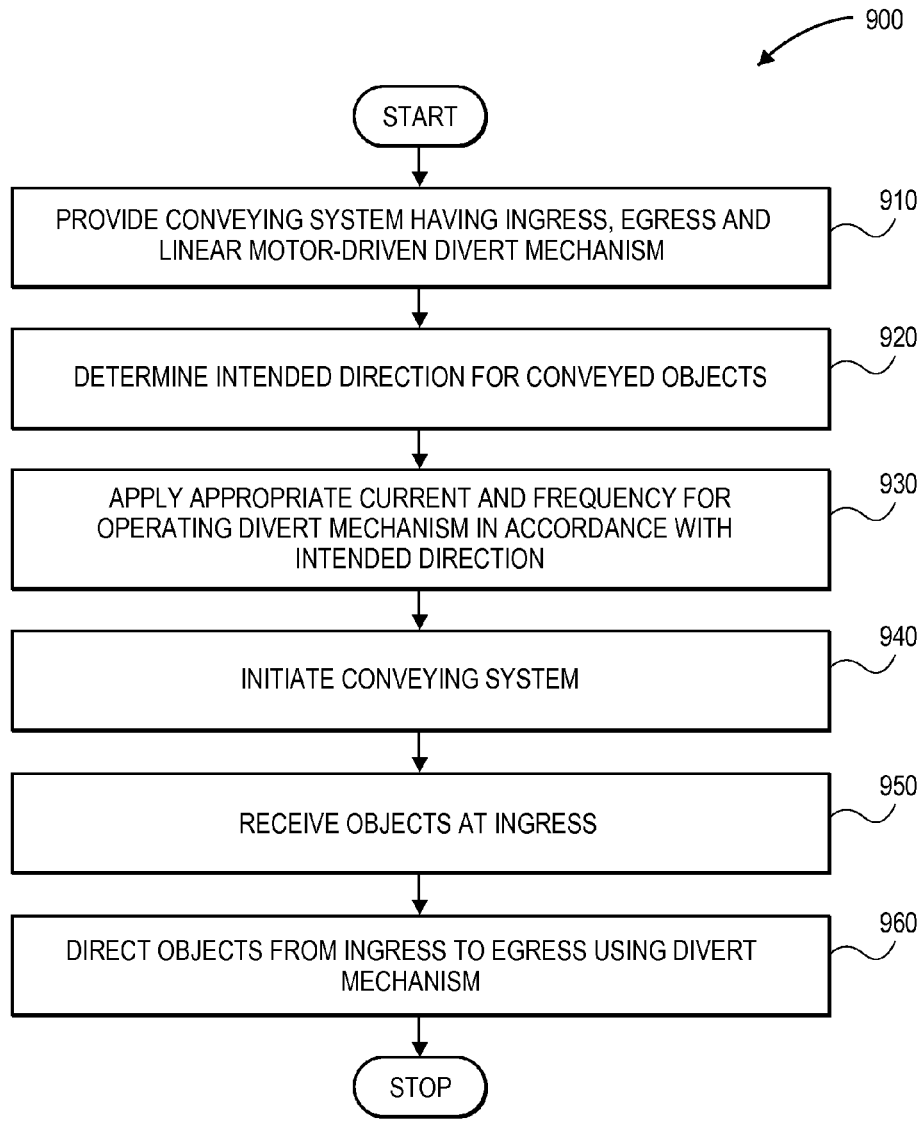
FIG. 9 is a flow chart of one method for conveying objects using a linear induction motor-driven divert mechanism, in accordance with embodiments of the present disclosure.

As is discussed above, the linear induction motor-driven diverts of the present disclosure may be used to transfer objects within a conveyor system having an ingress and one or more egresses by energizing stators associated with one or more spherical rotors at various times. Referring to FIG. 9, a flow chart 900 representing one embodiment of a method for conveying objects using a linear induction motor-driven divert mechanism is shown. At box 910, a conveying system having an ingress, at least one egress, and a linear induction motor-driven divert, such as the linear induction motor-driven divert mechanism 400 of FIG. 4, the linear induction motor-driven divert mechanisms 700 of FIG. 7A, 7B, 7C or 7D, or the linear induction motor-driven divert mechanisms 800 of FIG. 8A, 8B, 8C or 8D, is provided.

At box 920, an intended direction for the conveyed objects is determined. For example, referring again to the linear induction motor-driven divert mechanism 400 of FIG. 4, the egress conveyor 404, the egress chute 406 or the egress bin 408 may be selected. Similarly, referring again to the linear induction motor-driven divert mechanisms 700, 800 of FIGS. 7A and 8A, one of the egress conveyors 704, 706, 708 of FIG. 7A, or one of the egress conveyors 804, 806, 808 of FIG. 8A, may be selected.

At box 930, an appropriate current and frequency for operating the linear induction motor-driven divert is applied to one or more stators of the linear induction motor-driven divert, thereby causing one or more rotors to rotate about an appropriate axis and at a desired speed for conveying objects in the intended direction. For example, referring again to the linear induction motor-driven divert mechanism 400 of FIG. 4, one or more stator plates (not shown) may be energized to cause some or all of the rotors 410 to rotate in directions corresponding to the selected one of the egress conveyor 404, the egress chute 406 or the egress bin 408. At box 940, the conveying system may be initiated, such as by starting the ingress and at least one of the egresses.

At box 950, objects may be received at the ingress, i.e., placed upon one or more conveyors. For example, as is shown in FIG. 4, a parcel or other object may be passed along the ingress conveyor 402 toward the rotating rotors 410. At box 960, the objects traveling over the rotating rotors are directed from the ingress to the selected egress by the rotating rotors, and the process ends.

Figure 10:
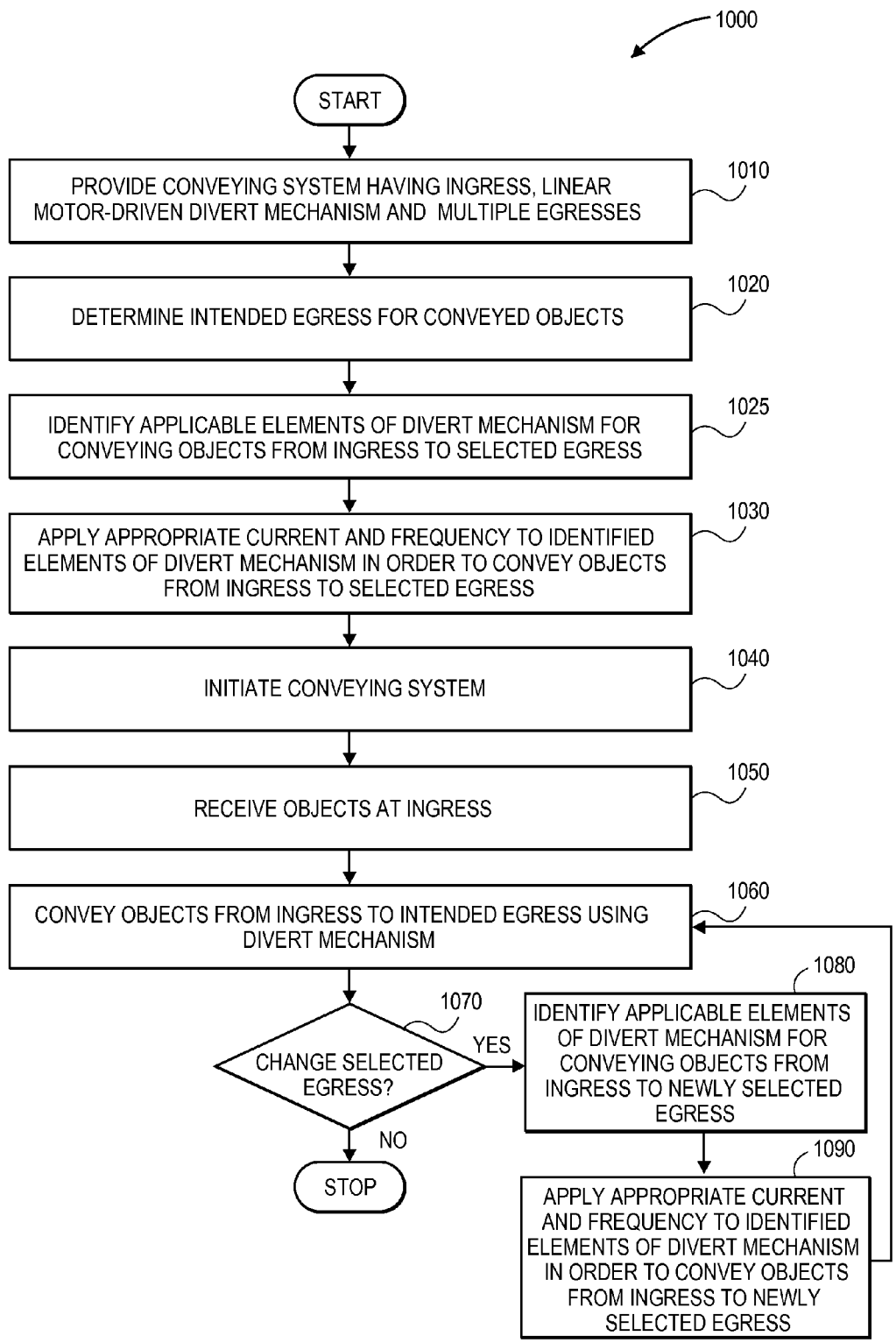
FIG. 10 is a flow chart of one method for conveying objects using a linear induction motor-driven divert mechanism, in accordance with embodiments of the present disclosure.

The linear induction motor-driven diverts of the present disclosure may also be used to cause one or more objects to travel in different directions across rotating rotors by changing the current and/or frequency applied to the stators associated with the respective rotors. A determination as to whether or which objects should be caused to travel in different directions may be made with regard to individual items, or to groups of items (e.g., one or more items), and may be implemented using one or more computer-driven control systems. Referring to FIG. 10, a flow chart 1000 representing one embodiment of a method for conveying objects using a linear induction motor-driven divert mechanism is shown. Except where otherwise noted, reference numerals preceded by the number "10" in FIG. 10 indicate components or features that are similar to components or features having reference numerals preceded by the number "9" shown in FIG. 9.

At box 1010, a conveying system having an ingress, a linear induction motor-driven divert and multiple egresses, such as the linear induction motor-driven divert mechanism 400 of FIG. 4, the linear induction motor-driven divert mechanism 700 of FIG. 7, or the linear induction motor-driven divert mechanism 800 of FIG. 8A, is provided. At box 1020, an intended egress for the conveyed objects is determined. For example, where a linear induction motor-driven divert includes a number of options for transferring one or more objects received from the ingress to one or more egresses, one of the egresses may be selected for a given object.

At box 1025, the applicable elements for conveying objects from the ingress to a selected egress may be determined. For example, a vector indicative of a direction and speed at which objects received from the ingress must travel in order to reach the egress selected at box 1020 may be generated, and the one or more stators that must be energized in order to cause rotors to rotate in a manner that imparts sufficient motion to objects consistent with the vector may be determined.

At box 1030, appropriate levels and frequencies of current are applied to the elements identified at box 1025. For example, where a vector indicative of a direction and speed at which objects must travel in order to reach a selected egress has been derived, the appropriate currents for causing travel along rotors in such a direction or at such a speed may be calculated with respect to a polarization (i.e., direction of current flow) and frequency. At box 1040, the conveying system is initiated, such as by starting one or more conveyor belts or other conveying apparatuses. At box 1050, objects are received at an ingress to the conveying system, and at box 1060, objects are conveyed from the ingress to the intended egress via the divert mechanism, such as is shown in FIG. 4.

At box 1070, a control system may determine whether the egress for the conveyed objects selected at box 1020 should be changed. Such a determination may be made with regard to individual items traveling along a conveyor system, or with regard to groups of items, and may be made on a temporary or long-term basis. If the selected egress for the items is to be changed, then the process advances to box 1080, where applicable elements of the divert mechanism for conveying objects from the ingress to the newly selected egress are identified, and to box 1030, where an appropriate amount and frequency of current are applied to the applicable elements identified for conveying objects from the ingress to the newly selected egress. For example, referring again to FIG. 4, where a first set of rotors 410 may be energized in order to cause a parcel to travel from the ingress conveyor 402 to the egress conveyor 404 of FIG. 4, and a second set of the rotors 410 may be energized in order to cause a parcel to travel from the ingress conveyor 402 to the egress chute 406 or the egress bin 408, the first set of the rotors 410 may be deenergized by current at a specific frequency, and the second set of the rotors 410 may be energized by current at a specific level and frequency. Subsequently, parcel received from the ingress conveyor 402 will be caused to travel to the egress chute 406 or the egress bin 408, instead of the egress conveyor 404, depending on the specific rotors 410 that were caused to rotate by the energization thereof, and the specific level and frequency of the current that were applied thereto. If no change is required to the selected egress, then the process ends.

Accordingly, the systems and methods of the present disclosure may feature one or more linear induction motor-driven diverts for conveying objects in a conveying system, or for changing a velocity (i.e., a direction or a speed) of one or more conveyed objects in the conveying system. Such linear induction motor-driven diverts may be configured to transport objects from an ingress to a selected one of a plurality of egresses, and may change an egress to which objects are to be transported by modifying the levels or frequencies of current applied to stators associated with one or more rotating spherical rotors, which may be performed using one or more computer-based control systems.

As is discussed above, the application of current in specific directions or at different frequencies to one or more selected stator elements (e.g., one or more of the stator plates 342A, 342B of FIG. 3, or the stator plates 642A, 642B of FIG. 6A or 6B) may be applied using one or more computer-driven control systems. Such control systems may have one or more computers, servers and/or devices featuring the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent art would realize that users of the linear induction motor-driven diverts disclosed herein may further employ any web-enabled or Internet applications or features, or any other client-server applications or features including electronic mail (or E-mail), or other messaging techniques, to connect to one or more networks or to communicate with one another, or with one or more computer systems, such as through short or multimedia messaging service (SMS or MMS) text messages. Those of ordinary skill in the pertinent art would also recognize that users of the linear induction motor-driven diverts of the present disclosure may operate any of a number of computing devices that are capable of communicating over a network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) for controlling the application of current to one or more stators and, therefore, for controlling the rate and direction of rotation of one or more corresponding rotors, may be stored on a computer-readable medium that is within or accessible by computers or control systems utilized by users of such linear induction motor-driven diverts and having sequences of instructions which, when executed by a processor (such as a central processing unit, or CPU), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Additionally, any form, type or variant of alternating current, and from any source, may be applied to create one or more magnetic fields and cause a rotation of one or more of the rotors disclosed herein. For example, standard AC power provided from a utility or other source may be applied to one or more stator plates. Alternatively, stepped AC power, i.e., "alternating" current generated by inverted direct current, may also be applied. Moreover, the application of current to stator plates in accordance with the present disclosure may be provided on one or more general purpose computers or dedicated computer machines for operating one or more control systems through the use of computer processors, i.e., in accordance with programmed schedules or instructions. Such computers may cause the application of power to one or more stator plates from any number or type of power sources, and may include any number or type of resistors, capacitors, inductors, transistors or other electrical components that may be required in order to cause the power to be applied to the stator plates.

Some embodiments of the systems and methods of the present disclosure may also be utilize computer executable program products including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments described herein or shown in the accompanying figures refer to the use of linear induction motor-driven divert mechanisms between or among other elements of a conveying system, i.e., between an ingress and one or more egresses, as is shown in FIG. 4, 7A-7D or 8A-8D, the systems and methods disclosed herein are not so limited. Those of ordinary skill in the pertinent arts would recognize that a conveying system may consist entirely of one or more of the linear induction motor-driven divert mechanisms disclosed herein, having any number of rotors of any size, each of which may be individually manipulated in order to cause a desired travel direction and rate of one or more objects being conveyed through a conveying system.

Moreover, although some of the embodiments described herein describe specific systems or methods for conveying parcels, or for controlling or changing the velocity of conveyed parcels, the systems and methods of the present disclosure are not so limited, and may be used with any means or method for conveying any form or type of object. Additionally, such means or methods may be used in series or in parallel, and independently or in conjunction with one another, in accordance with the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 9 or 10, the order in which the steps of the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Although the invention has been described and illustrated with respect to exemplary embodiments thereof, the foregoing and various other additions and omissions may be made therein and thereto without departing from the spirit and scope of the present disclosure.

What is claimed is:
1. A conveyor system comprising:
an ingress conveyor;
at least one egress conveyor; and
a linear induction motor-driven divert mechanism comprising:
 a plurality of spherical rotors rotatably positioned between an upper frame and a nesting table; and
 a power table having a stator plate associated with each of the plurality of spherical rotors;

wherein the power table is positioned beneath the nesting table, and wherein each of the spherical rotors is adapted to rotate about an axis upon an application of alternating current to a stator plate corresponding to the spherical rotor.

2. The conveyor system of claim 1, wherein an angular velocity of the rotation of each of the spherical rotors is determined based at least in part on a frequency of the alternating current applied to the stator plate associated with the spherical rotor.

3. The conveyor system of claim 1, wherein the linear induction motor-driven divert mechanism is configured in series between the ingress conveyor and the at least one egress conveyor, and wherein the linear induction motor-driven divert mechanism is adapted to receive objects from the ingress conveyor, to pass the objects over at least one of the spherical rotors, and to direct the objects in a direction of the at least one egress conveyor.

4. The conveyor system of claim 1, wherein the spherical rotor is formed from a paramagnetic material, and wherein the spherical rotor comprises a plurality of rotor slugs evenly distributed about a center of the spherical rotor.

5. A conveying system comprising:

a linear induction motor-driven conveying apparatus comprising a plurality of spherical rotors and a plurality of stator plates, wherein each of the stator plates is positioned beneath one of the spherical rotors, and wherein two or more of the plurality of spherical rotors are adapted to rotate about parallel axes upon energizations of the stator plates associated with the two or more spherical rotors.

6. The conveying system of claim 5, wherein the two or more spherical rotors are adapted to rotate about the parallel axes upon the energizations of the stator plates associated with the two or more spherical rotors with alternating current, and wherein an angular velocity of the two or more spherical rotors is based at least in part on a frequency of the alternating current.

7. The conveying system of claim 5, further comprising an ingress conveyor aligned to transport objects to the linear induction motor-driven conveying apparatus.

8. The conveying system of claim 6, further comprising a variable frequency drive controller for controlling the frequency of the alternating current.

9. The conveying system of claim 5, further comprising at least one egress conveyor aligned to receive objects from the linear induction motor-driven conveying apparatus.

10. The conveying system of claim 5, wherein the plurality of spherical rotors comprises a first group of spherical rotors and a second group of spherical rotors, wherein each of the first group of spherical rotors is adapted to rotate about parallel axes upon an energization of each of a first group of stator plates positioned beneath the first group of spherical rotors, and wherein each of the second group of spherical rotors is adapted to rotate about parallel axes upon an energization of each of a second group of stator plates positioned beneath the second group of spherical rotors.

11. The conveying system of claim 10, wherein the stator plates of the first group comprise at least one conductor oriented along a first axis, and wherein the stator plates of the second group comprise at least one conductor oriented along a second axis.

12. The conveying system of claim 5, wherein each of the two or more of the plurality of spherical rotors comprises an inner sphere having a plurality of magnetizable rotor slugs mounted therein, and wherein each of the magnetizable rotor slugs is distributed about a center of the inner sphere.

13. The conveying system of claim 12, wherein each of the two or more of the plurality of spherical rotors further comprises an outer layer surrounding the inner sphere.

14. The conveying system of claim 12, wherein the inner sphere is formed of a paramagnetic material, and wherein the magnetizable rotor slugs are formed from at least one of iron, steel, nickel or a rare Earth magnet.

15. A conveying system comprising:

a linear induction motor-driven conveying apparatus comprising a spherical rotor, a stator plate associated with the spherical rotor, an upper frame and a nesting table, wherein the spherical rotor is rotatably provided between an opening of the upper frame and a cavity in the nesting table, wherein the spherical rotor is adapted to rotate about a predetermined axis upon an energization of the stator plate with alternating current, and wherein an angular velocity of the spherical rotor is based at least in part on a frequency of the alternating current.

16. The conveying system of claim 15, wherein at least one of the upper frame or the nesting table is formed of a paramagnetic material.

17. A method for conveying objects comprising:

providing a conveying system comprising a linear induction motor-driven divert mechanism in series between an ingress and a plurality of egresses, wherein the divert mechanism comprises a plurality of spherical rotors rotatably positioned above a plurality of stator plates;

selecting a first one of the plurality of egresses;

selecting a first group of the plurality of spherical rotors for directing objects to the first egress;

applying an alternating current in a given polarization to at least one of the stator plates corresponding to the first group of spherical rotors, wherein the alternating current causes the first group of spherical rotors to rotate about parallel or collinear axes at an angular velocity defined at least in part on a frequency of the alternating current;

transporting at least one object from the ingress to the divert mechanism; and causing the at least one object to be directed to the first egress.

18. The method of claim 17, further comprising:

selecting a second one of the plurality of egresses;

selecting a second group of the plurality of spherical rotors for directing objects to the second egress;

securing the alternating current to the at least one of the stator plates corresponding to the first group of spherical rotors;

applying an alternating current in a given polarization to at least one of the stator plates corresponding to the second group of spherical rotors, wherein the alternating current causes the second group of spherical rotors to rotate about parallel or collinear axes at an angular velocity defined at least in part on a frequency of the alternating current;

transporting at least one object from the ingress to the divert mechanism; and causing the at least one object to be directed to the second egress.

* * * * *